April 6, 1965 M. E. HOLMGREN 3,177,016
HOSE COUPLING
Filed Dec. 5, 1960 2 Sheets-Sheet 1

INVENTOR.
Marvin E. Holmgren

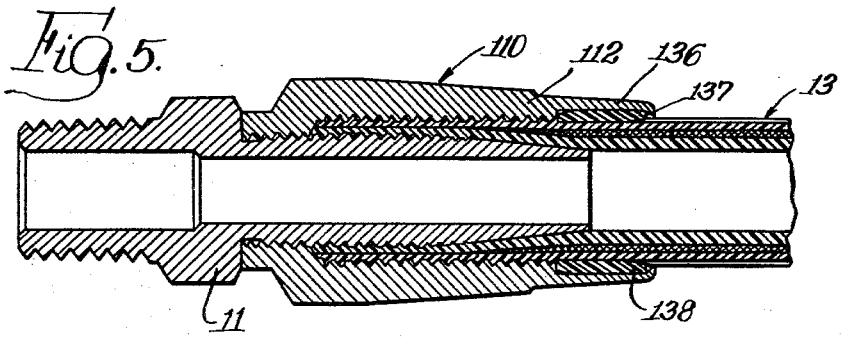
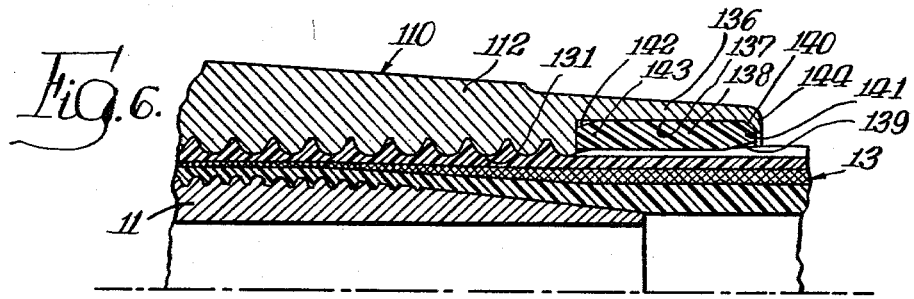
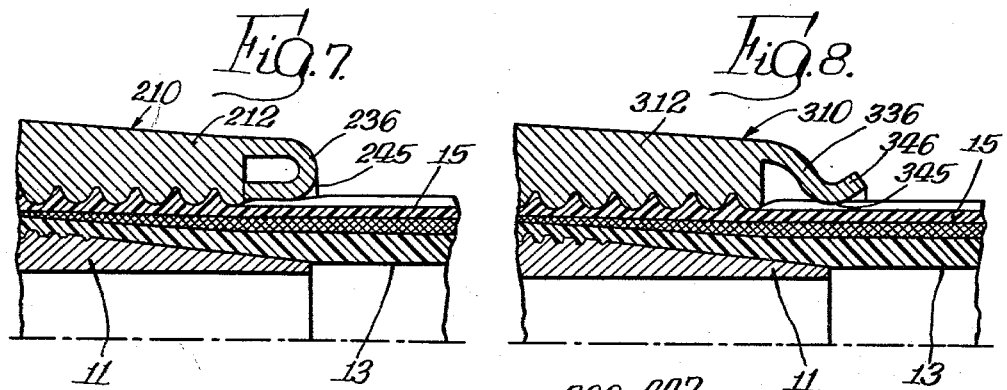
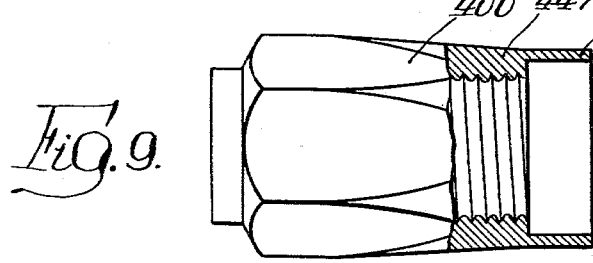

United States Patent Office 3,177,016
Patented Apr. 6, 1965

3,177,016
HOSE COUPLING
Marvin E. Holmgren, Prospect Heights, Ill., assignor to Imperial-Eastman Corporation, a corporation of Illinois
Filed Dec. 5, 1960, Ser. No. 73,759
15 Claims. (Cl. 285—247)

This invention relates to fittings and in particular to fittings for use with flexible hose.

One well-known form of flexible hose comprises a tubular core formed of a plastic such as nylon, a tubular sheath surrounding the core formed of a plastic such as nylon, and a braid layer between the core and sheath. A problem arises in connecting the end of such a hose to the conventional hose fittings as relative movement between the core, braid, and sheath axially of the hose often occurs thereby permitting the hose end to slip outwardly from the fitting. Another problem encountered in the use of the conventional fittings with such hose is the cracking of the outer sheath, particularly at reduced temperatures, as a result of stress points formed in the sheath by relatively sharp portions of the fitting engaging the sheath.

The present invention comprehends a new and improved fitting for use with such flexible hose which eliminates the above discussed problems in a simple and economical manner. Thus, a principal object of the present invention is to provide a new and improved fitting for use with flexible hose.

Another object of the invention is to provide such a fitting having new and improved means for co-operation with the core and sheath of a flexible hose having a tubular core formed of a plastic such as nylon, a tubular sheath surrounding the core formed of a plastic such as nylon, and a braid layer between the core and sheath.

A further object of the invention is to provide such a fitting including new and improved rounded thread means for cooperation with the core and sheath of the hose.

Still another object of the invention is to provide such a fitting including a truncated rounded thread portion providing an area in shear in the hose between successive turns thereof twice as great as the area in tension in the hose.

A yet further object of the invention is to provide such a fitting having a new and improved insert including a nose portion permitting facilitated installation in the end of the hose with the end of the hose retained in a circumjacent tubular socket.

Still another object of the invention is to provide such a fitting including a tubular socket having new and improved rounded means for precluding notching of the hose sheath.

A yet further object of the invention is to provide such a fitting including a ring formed of a plastic such as nylon at the outer end portion of the socket bore for precluding notching of the hose sheath.

A further object of the invention is to provide such a fitting wherein the outer end of the socket defines rounded means precluding notching of the hose sheath thereagainst.

Other features and advantages of the invention will be apparent from the following description taken in connection with the accompanying drawings wherein:

FIG. 5 is a diametric section of another form of fitting embodying the invention secured to the end of a flexible hose;

FIG. 6 is an enlarged fragmentary diametric section thereof;

FIG. 7 is an enlarged fragmentary diametric section of still another form of fitting embodying the invention secured to the end of a flexible hose;

FIG. 8 is an enlarged fragmentary diametric section of yet another form of fitting embodying the invention secured to the end of a flexible hose; and FIG. 9 is an elevation, partially in diametric section of a socket blank suitable for forming the fittings illustrated in FIGS. 7 and 8.

Figure 1:
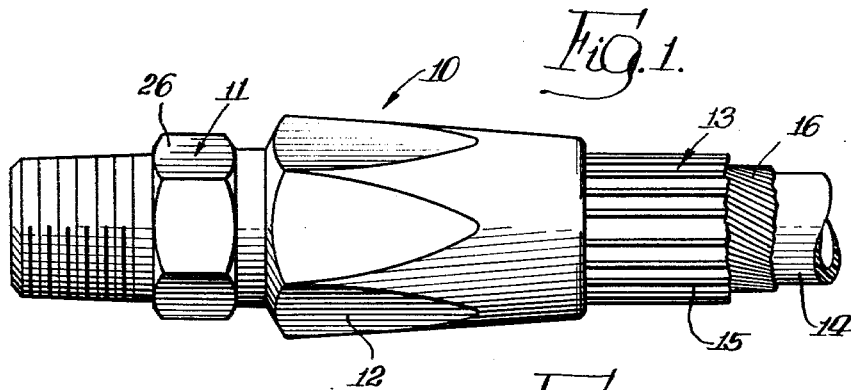
FIG. 1 is an elevation of a fitting embodying the invention secured to an end of a flexible hose.

In the exemplary embodiment of the invention as disclosed in FIGS. 1–4 of the drawing, a fitting generally designated 10 is shown to comprise a metallic tubular insert generally designated 11 and a metallic tubular socket 12 co-operating to retain sealingly the end of a flexible hose 13. Hose 13 comprises a conventional flexible hose including a tubular core 14 formed of a plastic such as nylon, a tubular sheath 15 formed of a plastic such as nylon, and a braid layer 16 between the core and sheath and formed of a plastic such as Dacron (a polyester product produced from a mixture of ethylene glycol and terephthatic acid or its derivatives). In such flexible hose, the braid 16 may have axial movement relative to the core and sheath and, thus, presents a problem in the positive retention of the hose end within a fitting. The fitting 10 effectively solves this problem providing a positive coupling to the hose end.

More specifically, tubular insert 11 comprises an outer end portion 17, a mid-portion 18, and an inner portion 19 including an inner end 20. A bore 21 extends axially fully through the insert. As best seen in FIG. 4, the outer end portion 17 is exteriorly defined by an axially outwardly narrowing frusto-conical guide surface 22 which preferably tapers relative to the axis of the insert at an angle of no greater than approximately 9° to preclude forcing of the hose outwardly from socket 12 when the insert end portion 17 is moved thereinto from the position of FIG. 3 to the position of FIG. 2. The taper angle is preferably as large as possible to effectively minimize the length of outer end portion 17. More specifically, where the fitting 10 is arranged for use with relatively small diameter hose, suc has ⅜" diameter hose or smaller, an angle of approximately 8° may be used; where the fitting is arranged for use with larger size hose, the angle is preferably decreased. Illustratively, in such a fitting for use with ¾" hose, a 4° angle has been found to be desirable.

Mid-portion 18 and inner portion 19 are exteriorly defined by a rounded thread 23. In mid-portion 18, the thread is frusto-conically truncated to define a spiral, axially inwardly widening extension 24 of guide surface 22 with the rounded root of thread 23 opening into the frusto-conical spiral surface 24 to provide tube-gripping edges 24a, as shown in FIG. 4. As best seen in FIG. 4, the outer diameter of the thread 23 is preferably substantially larger than the inner diameter of the hose core 14 to penetrate the core sufficiently to provide a firm grip thereof against longitudinal outward movement. The rounded thread 23 preferably is arranged to provide approximately twice as much area of the hose in shear as in tension per unit length of the hose; herein, the thread 23 is arranged so that the area of the core extending axially between successive turns of the thread at the crest thereof is approximately twice an annular area of the core in a plane extending transversely to the axis of the insert radially outwardly from the thread crest. Thus, improved positive, crack-free gripping of the hose core is obtained.

To preclude cracking of the nylon core, the radii of the rounded thread are preferably at least .005" and herein are .01'±.002". The frusto-conical thread portion 24 preferably should be free of burrs and sharp edges.

As shown, outer end 20 of the insert may be provided exteriorly with a threaded portion 25 for connection of the insert to a correspondingly threaded female element (not shown), and an annular arrangement of flat surfaces 26 for engagement by a suitable tool such as a wrench (not shown) in effecting the make-up of the fitting. The inner portion 19 of the insert terminates at the inner end of thread 23 in an outwardly facing radial shoulder 27 arranged to abut the socket 12 in the made-up arrangement of the fitting thereby providing an automatic indication of the completion of the assembly.

Socket 12 comprises a tubular member having a bore 28 extending axially therethrough for receiving the outer end portion 17, mid-portion 18, and outer end 29 of the inner portion 19 of the insert. The bore 28 is defined by an outer portion including a frusto-conical outwardly widening outer end portion 30 and a threaded mid-portion 31, and by a threaded inner portion 32. The outer end portion 30 and mid-portion 31 are diametrically larger than the portions 17, 18 and 19 of the insert to receive the end of the hose 16 therebetween, the inner diameter of threaded portion 31 being less than the outer diameter of the hose sheath 15 whereby the sheath is positively gripped by the threaded portion 31. As best seen in FIG. 4, the thread of socket portion 31 is rounded and preferably is rounded to have at least .01" radii to preclude cracking of the sheath. As shown in FIGURE 4, the outer end portion 30 and mid-portion 31 of the socket bore have a cumulative length greater than the axial cumulative length of the outer end portion 17 and mid-portion 18 of the insert 11. The hose sheath conventionally includes exterior longitudinally extending ribs 33 extending approximately one-half the over-all radial dimension of the sheath wall. More specifically, the sheath wall may be .04" thick with the ribs 33 of the sheath having a thickness of approximately .02" and the base portion 34 of the sheath having a similar thickness of .02". The thread 31 preferably penetrates fully through the ribs 33 but not the base portion 34 whereby the base portion may be maintained in tension throughout its radial extent. To assure positive retention of the sheath in the socket, a minimum interference of .015" between the outer diameter of the hose and the inner diameter of the socket thread 31 should be maintained. Preferably, the socket thread 31 has a thread depth of approximately .03".

Figure 2:
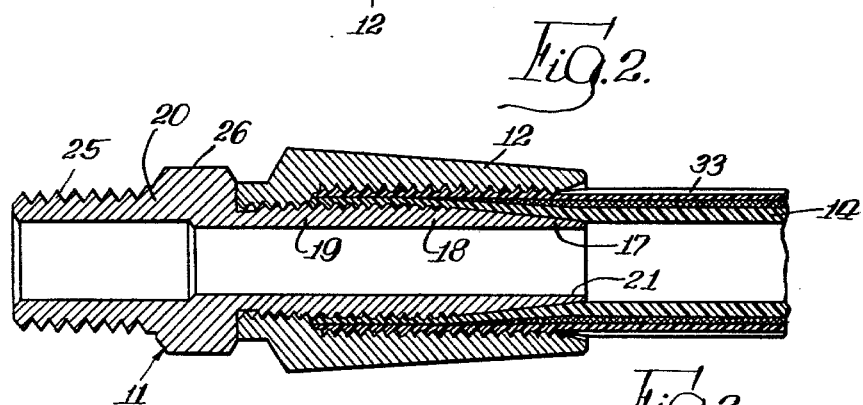
FIG. 2 is a diametric section thereof.
Figure 3:
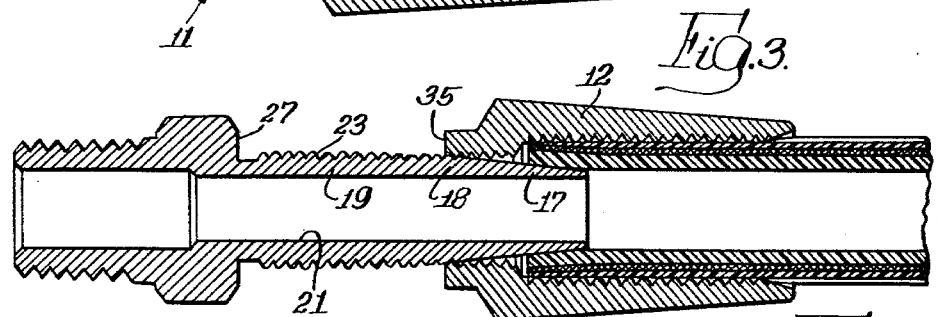
FIG. 3 is a diametric section similar to that of FIG. 2 but illustrating a first step in the make-up of the fitting.
Figure 4:
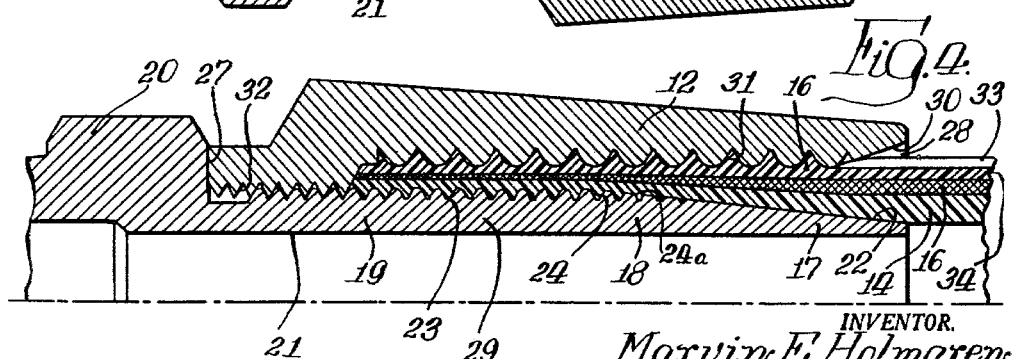
FIG. 4 is an enlarged fragmentary diametric section of the made-up fitting.

Thread 32 of the socket is arranged to co-operate with the thread 23 of the insert to permit the insert to be threaded into the socket from the position of FIG. 3 to the position of FIG. 2. Preferably, the socket thread 31 is of an opposite hand relative to the insert thread 23 to preclude unthreading of the hose from the socket as the insert is threaded thereinto. As shown in FIG. 4, when the insert is fully threaded into the socket, the inner end surface 35 of the socket abuts the radial surface 27 of the insert indicating to the operator the completion of the assembly. In the assembled arrangement, the braid portion 16 of the hose is subjected to a substantial compressive force, particularly between insert thread 23 and socket thread 31, augmenting the retention of the core 14 and sheath 15 effected by the insert and socket respectively as discussed above. As shown in FIG. 4, in the made-up arrangement of the fitting, a substantial axial length of thread 31 is disposed outwardly of the insert portion 19 having the full thread 23. As illustrated, this length is at least equal to the radius of the thread 23 measured from the axis of the insert to the tip of the thread. Thus, an improved grip of the tube is provided. As a substantial portion of each of the core and sheath remains in tension, breaking of these hose portions is effectively precluded. Further, as the portions of the fitting engaging the hose are rounded, cracking of the hose such as due to flexing at relatively low temperatures is effectively precluded.

Referring now to FIGS. 5 and 6, a modified form of fitting generally designated 110 is shown to comprise a fitting generally similar to fitting 10 but provided with an elongated socket 112 having an outer extension 136 provided with a radially inwardly opening recess 137 in which is disposed a plastic ring 138. Ring 138 may be formed of a molded plastic such as nylon, and may have an inside diameter slightly larger than the inside diameter of the socket thread 131. The ring is rectangular in cross section, elongated axially, and includes a radially inner frusto-conical chamfer 139 and a radially outer frusto-conical chamfer 140 at its outer end 141 and a radially outer frusto-conical chamfer 142 at its inner end 143. As shown herein, chamfer 139 may have a taper angle relative to the axis of the ring of approximately 20°, chamfer 140 may have a taper angle of approximately 45° relative to the axis of the ring, and chamfer 142 may have a taper angle of approximately 30° relative to the axis of the ring. The socket extension 136 is provided with a turned end 144 engaging the chamfer surface 140 to retain the ring within the extension groove 137. Thus, ring 138 effectively precludes notching of the hose notwithstanding flexing of the hose at the outer end of the fitting. Fitting 110 has been found to provide improved crack resistance, particularly in the smaller size fittings.

Turning now to FIG. 7, a fitting 210 is provided with a socket 212 having an underturned extension 236 including a rounded outer surface 245 which provides crack-resistant engagement with the hose sheath 15.

In FIG. 8, still another fitting 310 is shown to include a socket 312 provided with an inturned extension 336 having an outturned tip 346 defining radially inwardly a rounded surface 345 engaging the hose sheath 15. Each of sockets 212 and 312 may be formed from a socket blank 400 having an undercut extension 436 projecting coaxially from the outer end 447 of the socket blank. The underturned extension 236 and reversely turned extension 336 may be formed from extension 436 by suitable crimping means (not shown). As shown in FIGS. 7 and 8, the extensions are turned sufficiently inwardly to have an inner diameter approximately equal to the outer diameter of the hose. Except as otherwise noted, fittings 110, 210 and 310 are similar to fitting 10 and function in a similar manner. Except as described above, socket blank 400 is similar to socket 12.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A fitting for use with flexible hose having a tubular core formed of a plastic such as nylon, a tubular sheath surrounding the core formed of a plastic such as nylon, and a braid layer between the core and sheath, comprising: a tubular insert having an outer end portion, a mid-portion, an inner portion, and a bore extending co-axially through the insert opening outwardly through the outer end portion, said outer end portion being defined exteriorly by an axially outwardly narrowing frusto-conical guide surface, said mid-portion being defined exteriorly by a rounded thread frusto-conically truncated to define a spiral, axially inwardly widening extension of said guide surface, and said inner portion being defined exteriorly by a round thread continuing from the inner end of the thread of said mid-portion and having a constant outer diameter larger than the inner diameter of the hose; and a tubular socket having a bore extending axially therethrough for receiving the insert coaxially therein, said bore having an outer end portion, a mid-portion, and an inner portion, said outer end and mid-portion of the bore being diametrically larger than said outer end portion and mid-portion of the insert and having an axial cumulative length greater than the axial cumulative length of the outer end portion and mid-portion of the insert, the outer end of the socket including rounded means for precluding notching of the hose thereat, said mid-portion of the socket bore being defined by a round thread having a constant inner diameter smaller than the outer diameter of the hose, and said inner portion of the socket bore being threaded for engagement with said thread of the inner portion of the insert to draw the insert axially outwardly to a position wherein the outer end of said inner portion of said insert is within said mid-portion of the socket bore whereby the outer end portion, the mid-portion, and the outer end of the inner portion of the insert are forced into a hose end coaxially in the outer end portion and mid-portion of the socket bore for retaining the hose end in the space therebetween, said threaded mid-portion of the socket bore extending in surrounding relationship to said inner portion of the insert in the made-up arrangement of the fitting a length at least equal to the outer radius of the thread of the mid-portion of said insert measured from the axis of the insert to the tip of the thread.

2. A fitting for use with flexible hose having a tubular core formed of a plastic such as nylon, a plastic tubular sheath surrounding the core formed of a plastic such as nylon, and a braid layer between the core and sheath, comprising: a metallic tubular insert having an outer end portion, a mid-portion, an inner portion, and a bore extending coaxially through the insert opening outwardly through the outer end portion, said outer end portion being defined exteriorly by an axially outwardly narrowing frusto-conical guide surface, said mid-portion being defined exteriorly by a rounded thread frusto-conically truncated to define a spiral, axially inwardly widening extension of said guide surface, and said inner portion being defined exteriorly by a round thread continuing from the inner end of the thread of said mid-portion and having a constant outer diameter larger than the inner diameter of the hose; and a metallic tubular socket having a bore extending axially therethrough for receiving the insert coaxially therein, said bore having an outer end portion, mid-portion, and an inner portion, the wall of the socket defining said mid-portion of the bore being arranged to engage the hose without cutting the wall thereof, said mid-portion being diametrically larger than said insert and having a constant minimum diameter smaller than the outer diameter of the hose and having a length greater than the axial cumulative length of the outer end portion and mid-portion of the insert, said mid-portion of the socket bore being defined by a round thread, and said inner portion of the socket bore being threaded for engagement with said thread of the inner portion of the insert to draw the insert axially outwardly to a position wherein the outer end of said inner portion of said insert is within said mid-portion of the socket bore whereby the outer end portion, and mid-portion, and the outer end of the inner portion of the insert are forced into a hose end coaxially in the outer portion of the socket bore for retaining the hose end in the space therebetween, said threaded mid-portion of the socket bore extending in surrounding relationship to said inner portion of the insert in the made-up arrangement of the fitting a length at least equal to the outer radius of the thread of the mid-portion of said insert measured from the axis of the insert to the tip of the thread.

3. The fitting of claim 2 wherein the taper angle of said guide surface relative to the axis of the insert is no greater than approximately 9°.

4. The fitting of claim 2 wherein all edges of the insert engageable with the hose are rounded to have at least a .005 inch radius.

5. The fitting of claim 2 wherein all edges of the socket engageable with the hose are rounded to have at least a .01 inch radius.

6. The fitting of claim 2 for use with a hose having a sheath provided with a plurality of longitudinally extending outer ribs approximately .02 inch high, wherein the thread of said mid-portion of the socket bore is approximately .03 inch deep.

7. The fitting of claim 2 wherein the inner diameter of the thread of the socket mid-portion is at least .015 inch less than the outer diameter of the hose.

8. The fitting of claim 2 wherein the round thread of the insert is preselected to provide an area in shear in the hose between successive turns twice as great as the area in tension in the core of the hose radially outwardly of the insert thread.

9. The fitting of claim 2 wherein said outer end portion of the socket bore includes an annular recess opening radially inwardly and a ring coaxially in said recess formed of a plastic such as nylon and having an inner diameter slightly larger than the inner diameter of the thread of said mid-portion of the socket bore.

10. The fitting of claim 2 wherein said outer end portion of the socket bore includes an annular recess opening radially inwardly and a ring in said recess and formed of a plastic such as nylon for precluding notching of the hose thereat, said ring having a radially inner, axially outer end surface comprising an axially outwardly enlarging, frusto-conical surface.

11. The fitting of claim 2 wherein said outer end portion of the socket bore includes an annular recess opening radially inwardly and a ring in said recess and formed of a plastic such as nylon for precluding notching of the hose thereat, said ring having an inner diameter smaller than the outer diameter of the hose.

12. The fitting of claim 1 wherein the rounded means at the outer end of the socket comprises a rounded outer end of the socket and said outer end of the socket is inturned.

13. The fitting of claim 1 wherein the rounded means at the outer end of the socket comprises a rounded outer end of the socket and said outer end of the socket is underturned.

14. The fitting of claim 1 where the rounded means at the outer end of the socket comprises a rounded outer end of the socket and said rounded outer end of the socket has an inner diameter substantially equal to the outer diameter of the hose.

15. The fitting of claim 1 wherein the rounded means at the outer end of the socket comprises a rounded outer end of the socket.

References Cited by the Examiner

UNITED STATES PATENTS

| | | | |
|---|---|---|---|
| 1,175,834 | 3/16 | Stephens | 285—259 |
| 2,540,113 | 2/51 | Hartley | 285—259 |
| 2,965,395 | 12/60 | Schmohl | 285—259 |
| 2,974,980 | 3/61 | Boyle | 285—247 |
| 3,042,737 | 7/62 | Brumbach et al. | 285—251 |

FOREIGN PATENTS

| | | |
|---|---|---|
| 1,177,502 | 12/58 | France. |
| 810,335 | 8/51 | Germany. |
| 11,394 | 5/07 | Great Britain. |
| 531,186 | 12/40 | Great Britain. |

THOMAS F. CALLAGHAN, *Primary Examiner.*

CARL W. TOMLIN, *Examiner.*